United States Patent
Fazi

(10) Patent No.: US 9,633,484 B2
(45) Date of Patent: Apr. 25, 2017

(54) VEHICLE DEVICE INSTALLATION SYSTEM

(71) Applicant: Directed, LLC, Vista, CA (US)

(72) Inventor: Peter Fazi, Lachine (CA)

(73) Assignee: Directed, LLC

(*) Notice: Subject to any disclaimer, the term of this patent is extended or adjusted under 35 U.S.C. 154(b) by 0 days.

(21) Appl. No.: 14/599,264

(22) Filed: Jan. 16, 2015

(65) Prior Publication Data

US 2016/0210794 A1    Jul. 21, 2016

Related U.S. Application Data

(60) Provisional application No. 61/929,035, filed on Jan. 18, 2014.

(51) Int. Cl.
*G01M 17/00* (2006.01)
*G07C 5/00* (2006.01)
*G07C 5/08* (2006.01)
*B60W 10/00* (2006.01)

(52) U.S. Cl.
CPC ............ *G07C 5/008* (2013.01); *B60W 10/00* (2013.01); *G07C 5/0808* (2013.01); *G07C 5/0816* (2013.01); *G07C 2205/02* (2013.01)

(58) Field of Classification Search
CPC ... G07C 5/008; G07C 5/0808; G07C 2205/02
USPC ............. 701/33.2, 31.4, 31.5; 455/41.1, 41.2
See application file for complete search history.

(56) References Cited

U.S. PATENT DOCUMENTS

2009/0259358 A1* 10/2009 Andreasen ........... G07C 5/0808
                                                        701/31.4
2014/0046570 A1*  2/2014 Mohn ...................... G08G 1/00
                                                        701/99
2016/0078691 A1*  3/2016 Roepke .................... G07C 5/02
                                                        701/31.5

* cited by examiner

*Primary Examiner* — Thomas G Black
*Assistant Examiner* — Luke Huynh
(74) *Attorney, Agent, or Firm* — KC Bean, Esq.

(57) ABSTRACT

A device installation system for providing a tool for use by installers to assist in obtaining vehicle specific information such as wiring diagrams, technical information and direct access to technical support technicians. The system further provide for testing, trouble shooting and configuration of installed vehicle devices.

5 Claims, 3 Drawing Sheets

VEHICLE DEVICE INSTALLATION SYSTEM

CROSS-REFERENCE TO RELATED APPLICATIONS

This application claims the benefit from U.S. Provisional Patent Application No. 61/929,035 filed Jan. 18, 2014 and entitled VEHICLE DEVICE INSTALLATION SYSTEM.

BACKGROUND OF THE INVENTION

1. Field of Invention

The present invention is broadly related to the technical field of vehicle data bus systems. More particularly, the present invention is in the technical field of installing and programming devices connected to a vehicle via the data bus system. The device installation system of the present invention provides a tool for use by installers of aftermarket devices to the bus to assist in obtaining vehicle specific information such as wiring diagrams, technical information and direct access to technical support technicians. The system further provide for testing, trouble shooting and configuration of installed vehicle devices.

2. Discussion of the Art

Vehicle data bus systems are known and are desirable in that they allow for the elimination of more extensive direct wiring of each device or component within a vehicle to power and ground. Further, data bus systems allow for digital communication with and between devices associated with the data bus. A number of patents are directed to digital data bus or multiplex communications networks or circuits in a vehicle. For example, U.S. Pat. No. 4,538,262 Sinniger et al. discloses a bus system including a master control unit and a plurality of receiver-transmitter units connected thereto. Similarly, U.S. Pat. No. 4,055,772 to Leung discloses a power bus in a vehicle controlled by a low current digitally coded communications system. Other references disclosing various vehicle data bus control systems include, for example, U.S. Pat. No. 4,760,275 to Sato et al ; U.S. Pat. No. 4,697,092 to Roggendorf et al.; and U.S. Pat. No. 4,792,783 to Burgess et al.

Several data bus communication protocol standards have been developed for vehicles transmitting data on vehicle data bus networks. One of the earliest standards was, for example, the Society of Automotive Engineers "Surface Vehicle Standard, Class B Data Communications Network Interface", SAE J1850, July 1995. To meet increasing engineering and design complexities of newer vehicles, other communication standards have been developed. More recently the Controller Area Network (CAN), Media Oriented Systems Transport (MOST), Local Interconnect Network (LIN), and FlexRay bus system protocols have taken increasingly important positions. Other network formats are being implemented or proposed for wireless communications between vehicle devices, various node communications or controller class. Further, Keyword Protocol 2000 (KWP) has been developed specifically for allowing communication through the vehicle OBDII port. KWP protocol covers the application layer in the OSI model computer networking. The protocol is standardized by International Organization for Standardization as ISO 14230. KWP2000 also covers the session layer in the OSI model, in terms of starting, maintaining and terminating a communications session.

A number of electronic devices are installed in vehicles to enhance driving performance and to provide greater security, convenience and entertainment features. These devices include a great variety of sensors, controllers and actuators associated with a broad number of vehicle operations. In many instances, vehicle owners desire to have products installed in the vehicle after it has been purchased from the dealership. Such products could include security systems, remote start systems, enhanced audio systems, entertainment systems, communication systems and similar devices.

As vehicle technology has evolved to use digital vehicle data bus systems to control vehicle devices, aftermarket manufacturers have developed products, generally referred to as interface modules, to allow communication between aftermarket devices and the vehicle data bus by reading from and sending data messages to the vehicle data bus. The interface module acts as a communication link and converts analog signals generated by aftermarket systems to digital signals that can be utilized to control devices in the vehicle. The interface module also reads digital signals transmitted on the bus and converts them to analog electrical pulses to operate with the aftermarket product. The interface module connection to the vehicle data bus has generally been made through connection through the OBDII port or by hard wiring a data line to the data bus network.

Through the use of a data bus interface module the installation of aftermarket devices has become greatly simplified, reducing installation errors and the time necessary for installation. However, even with easier installation by connection with the vehicle data bus communication network, with variations in communication protocol standards between manufactures and with the great variation of communication signals between make, model, year and trim level from the same manufacturer, there remain significant challenges for aftermarket installers in installing and configuring the aftermarket device to specific vehicle. Each vehicle has its own wiring configuration and uses a set of digital signals that are unique to the particular make and model of vehicle. Accessing information about the vehicle can be time consuming and may require the installer to access information about the vehicle at a computer terminal location that is not near the vehicle or convenient to access. If the installer has problems with the installation, he may need to contact the device manufacturer for technical assistance. This also may not be convenient to do at the vehicle. Additionally, when testing the installation, the installer may need to verify the actuation of a particular motor or actuator. For example, the installer may need to witness the movement of the door lock mechanism in response to a signal issued by the installer during testing. If the installer is not able to be in a location to see the change in position of the actuator, he may need to recruit the assistance of a second person to assist in the testing procedure.

Accordingly, there is a need in the industry for an aftermarket tool and system that assists in simplifying the installation and configuration for aftermarket devices in a vehicle having a data bus system.

BRIEF SUMMARY OF THE INVENTION

The objects of this invention are to provide novel solutions to overcome the limitation described relating to current vehicle device installation systems.

In one embodiment, disclosed is tool to assist in installing and programming devices installed in a vehicle having a data bus. The system provides a module in communication with the vehicle devices connected to the data bus; the module is further in wireless communication with a hand held processor in the possession of the installer. The system is use by device installers to assist in obtaining vehicle specific information such as wiring diagrams, technical information and access to technical support technicians. The system further provide for testing, trouble shooting and configuration of the installed device.

In one aspect of the invention, provided is a tool for assisting with the installation of devices in a vehicle having a data bus.

In another aspect of the invention, the tool is accessible by a smart phone or tablet computer.

In another aspect of the invention the tool functions to program devices installed in a vehicle. The device allows an installer to flash controllers, program device functions and features.

In another aspect of the invention, provided is a means to readily access vehicle wiring diagrams and other documentation related to the installation or function of a device.

In another aspect of the invention, provided is a tool that allow installers to test the installation and troubleshoot installation issues.

In another aspect of the invention, provided is a system that allows installers to see and record data messages being communicated between devices installed in the vehicle.

In another aspect of the invention, a communication link is provided between the installer and technical support.

In another aspect of the invention, the system can log and transfer to a central data base vehicle data messages that are communicated on the data bus. The data can be aggregated for use in evaluating installation errors and building technical support protocols.

In another aspect of the invention, provided is a forum for installers to share their experiences and stories, or to read the writings of others.

DESCRIPTION OF THE INVENTION

Example embodiments are described herein in the context of installing and programming devices connected to a vehicle via the data bus system. The device installation system of the present invention provides a tool for use by installers to assist in obtaining vehicle specific information such as wiring diagrams, technical information and direct access to technical support technicians. The system further provide for testing, trouble shooting and configuration of installed vehicle devices. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiment as illustrated in the accompanying drawings. The same reference indicators will be used throughout the drawings and the following description to refer to the same or like items.

Figure 1:
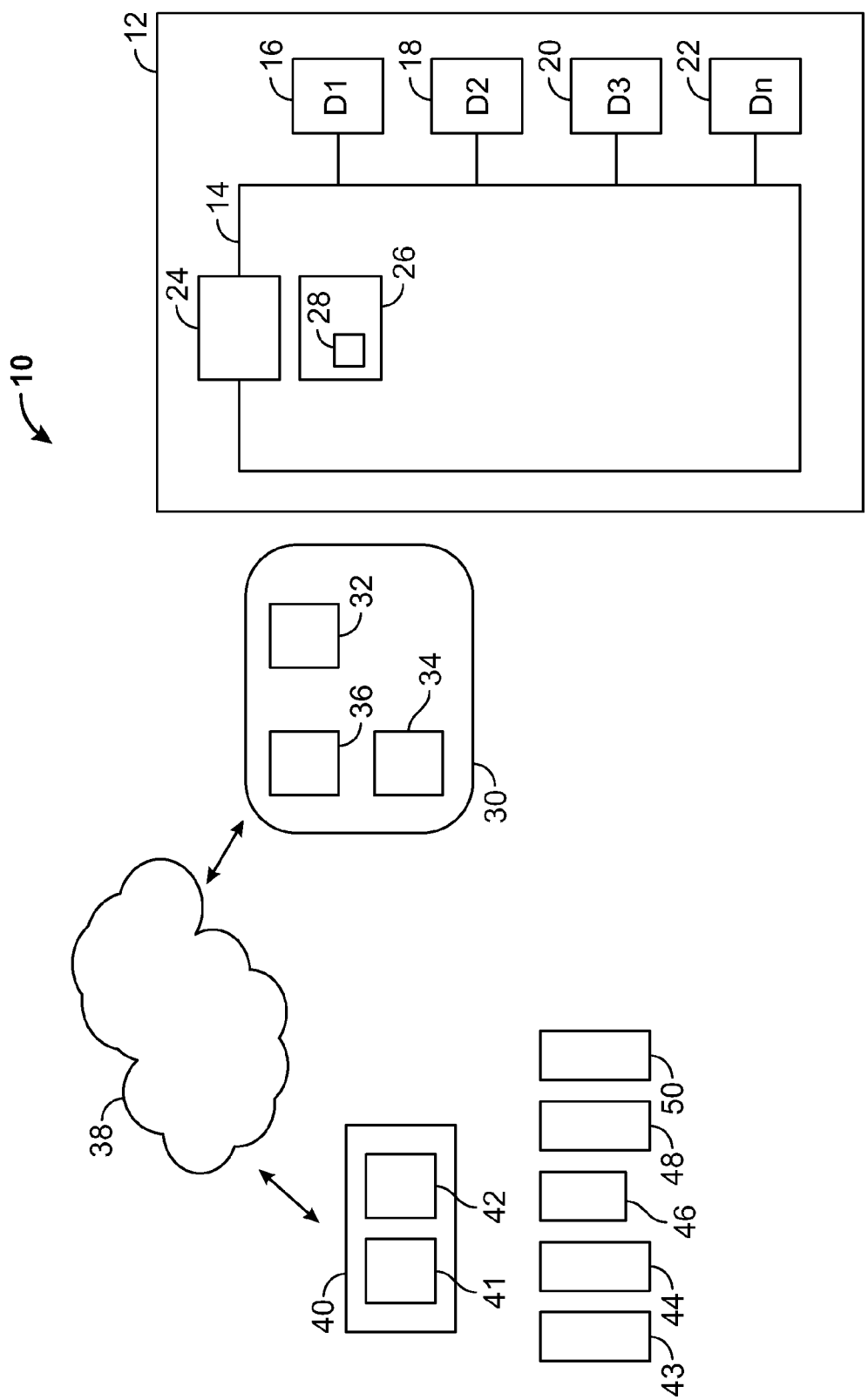
FIG. 1 is a block diagram demonstrating one embodiment of the vehicle device installation system of the present invention.
Figure 3:
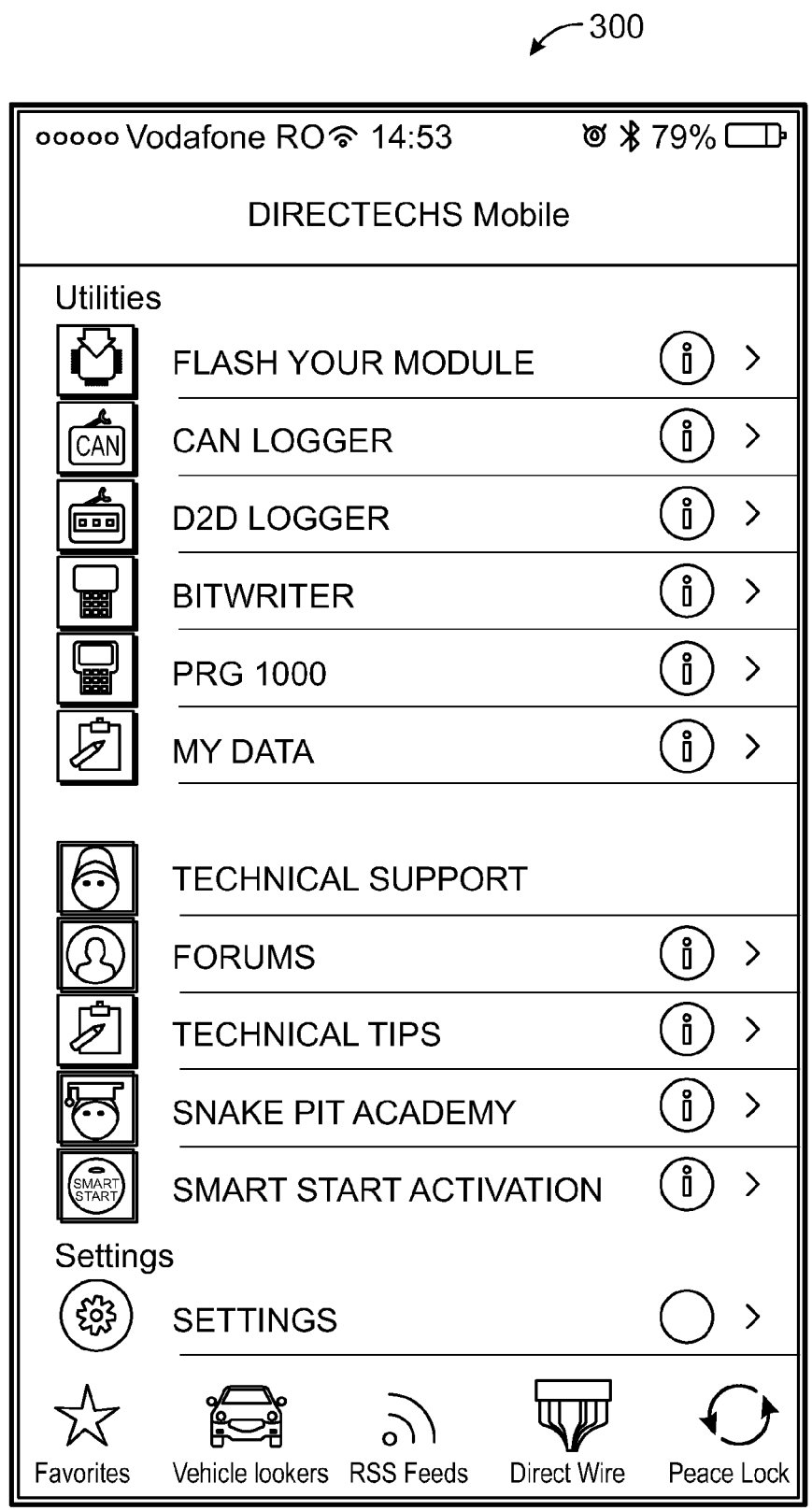
FIG. 3 is a block diagram demonstrating a screen shot of the user interface of the vehicle device installation system of the present invention.

Now with reference to FIG. 1, in one embodiment, disclosed is a system 10 to assist in installing and programming devices installed in a vehicle 12 having a data bus 14. The data bus 14 includes a connector 24 such as an on board diagnostic (OBD) or OBDII connector. The system 10 provides a module 26 installed in a vehicle. The module 26 is in communication with the vehicle data bus 14 and is preferably connected to the data bus through the OBDII connector 24, but may be directly hard wired to the data bus 14 or interfaced to the data bus 14 through another device D1-Dn already in communication with the data bus 14. The in-vehicle module 28 is in wireless communication, preferably using a Bluetooth® module 28 with a handheld processor 30 having a Bluetooth module 32. The handheld processor 30 is preferably a smart phone or tablet computer, but can be any independent device having adequate memory, a controller and transceiver. The handheld processor 30 includes a memory 34 and microprocessor 36 for processing executable code. The memory 34 is loaded with software for providing access to the system functions and features. Preferably software is uploaded from a remote computer server through the internet or through a cellular telephone network. However, the software can be provided through any data transfer means such as direct hard wire connection using a USB port or through a direct satellite feed. FIG. 3 shows one possible display of the user interface 300 for the software that may be loaded into the handheld processor 30. The specific functions and feature are discussed in detail below.

Figure 2:
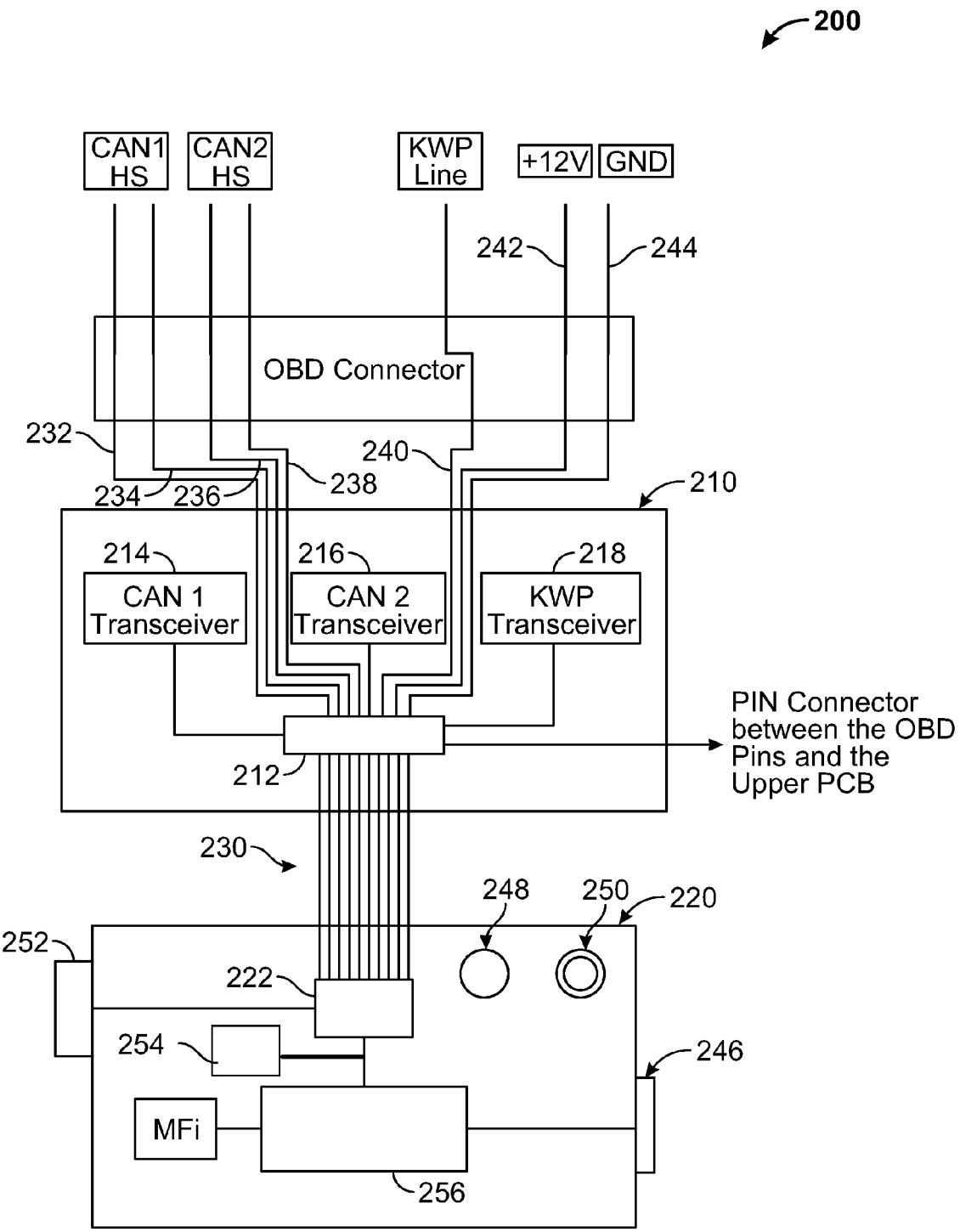
FIG. 2 is a block diagram demonstrating one embodiment of the vehicle device installation system of the present invention showing a two printed circuit board configuration.

Referring now to FIG. 2, in the disclosed embodiment, the in-vehicle module 200 is comprised of a lower printed circuit board 210 and an upper printed circuit board 220 in a stacked configuration. The lower and upper boards are connected by a standard ribbon cable 230 with a lower pin connector 212. The PCB design can take many forms or configurations and may be combined into a single board design. The lower board 210 includes CAN 1 transceiver a CAN 2 transceiver 216, and a KWP transceiver 218. However, any data bus protocol transceiver is contemplated and may be used. The lower board 210 is further comprised of a PIN connector 212 to provide for connecting to the OBDII port of the vehicle and provide data transfer between the in-vehicle module 200 and the vehicle data bus.

The PIN connector 212 includes lines for the CAN 1 HS 232, and 234, the CAN 2 HS 236 and 238, the KWP data line 240 and power 242 and ground 244.

The upper board 220 is comprised of microcontroller 222. The microcontroller 222 may have a memory and includes executable code that provides access to certain programmable features and then manages the I/O functions of the system. The microcontroller 222 is associated with a user push button switch 248 that allow access to the programmable features and also includes a tri-colored LED light 250 that provide output indicates various system outputs.

The upper board 220 is further comprised of a universal serial USB data bus connector 246 and a data to data D2D connector 246. The USB connector 246 allows for flashing the module controller 222 with firmware from a computer or allows for communication with other USB capable devices. The D2D line 252 provides for communication with other devices that may be installed on the vehicle. The upper board 220 is further comprised of a universal asynchronous receiver/transmitter, (UART) 254 for translating data between parallel and serial forms. UARTs are commonly used in conjunction with communication standards such as EIA, RS-232, RS-422 or RS-485. The universal designation indicates that the data format and transmission speeds are configurable. The electric signaling levels and methods (such as differential signaling etc.) are handled by a driver circuit external to the UART, generally in the microcontroller.

In the currently disclosed embodiment, the UART 254 is part of an integrated circuit used for serial communications over a computer or peripheral device serial port. Many modern ICs now come with a UART that can also communicate synchronously; these devices are called USARTs (universal synchronous/asynchronous receiver/transmitter). Any of these UART configurations may be used.

In the disclosed embodiment, the upper PCB 220 of the module 200 includes a Bluetooth® wireless transceiver 256 associated with the microcontroller 222 for providing a wireless communication link. Bluetooth® is preferable because it is configurable with most smart phones and tablets, but any wireless communication standard may be used.

Now again with reference to FIG. 1, the module 26 is in wireless communication with a hand held processor 30 that is in the possession of the installer. The hand held processor 30 can be any smart phone, tablet or a single purpose processor. Executable code in the form of a downloadable app may be uploaded to the processor 30 through a cellular phone receiver from a designated Internet website or from a local WIFI. The app will have a number of function icons that can be configured by the user or set by the manufacturer. The represented functions include, vehicle wiring data base, technical manuals, RSS feeds, installer blogs, direct email support to a technician, phone support to a technician, software updates, and similar technical support tools. It is contemplated that any type of data that can be configured in a transmittable digital format may be accessible through the app.

In the disclosed embodiment, to configure the communication link between the module 26 and the phone 30, the user enters the app and goes to the setting of the phone to turn on Bluetooth® function and establish pairing between the phone 30 and the in-vehicle module 26. Transmission of the signal begins and pairing is accomplished according to the Bluetooth® standard. The module LED indicator as shown in FIG. 2 as 250 will display various colors, patterns and sequences of light flashes to indicate the status of the wireless connection and other out puts of the module 26. For example, if a Green LED remains on, the phone Bluetooth® connection is established but not authenticated. If the Blue LED remains lighted, the phone Bluetooth® connection is fully established. If a Blue LED remains on and a Green LED fading in/out slowly, this indicates a wireless connected and the device is receiving data. If the Blue LED is fading in/out slowly and the Green LED remains on, this indicates a wireless connection with the device transmitting data. It will be appreciated by one skilled in the art that any sequence of LED light flashes can be used to indicate the status of any function or mode of the system or a device in communication on the data bus.

Referring again to FIG. 1, after the wireless connection is established between the module 26 and the smart phone or tablet 30, the user, through the app, establishes an account with a data service provider 40 through a wireless network 38. To establish an account or to access the app, the user may be required to accept, by selecting an icon on the app interface, the terms of an end user license agreement.

The service provider 40 hosts various servers 41 and databases 42 that maintain variety of categories of vehicle specific information used by installers during the installation of devices 16-22. Through the app installed on the hand held processor 30, access is provided to a variety of data bases containing vehicle specific data words for various bus formats and configurations 43, installation manuals 44, vehicle wiring diagrams 46, device configuration settings 46, technical support information 48, and other support functions of the app 50. It will be appreciated by one skilled in the art that the types and categories of support information listed are provided as examples, but any type can be maintained in the databases and accessed by the installer from the hand held processor 30 through the app.

To assist with installations, the system 10 allows installers to obtain current wiring information for a plurality of vehicles which are maintained by the service provider 40 in its databases 42. Selection is made by entering specified fields within the app interface for the specific make model and trim level of the vehicle. A request is sent to the service provider 40 and the appropriate data files are retrieved and returned.

If an interface module, as discussed above, is necessary for the installation of a device 16-22, data word files unique for the specific vehicle make and model can be retrieved from the service provider 40 by entering the vehicle year, make and model into the appropriate fields of the app. After retrieval of the files from the service provider 40, the data word file is flashed to the memory of the interface module through the USB connector 246 or data to data connector 252 as shown in FIG. 2. Various USB and data connector cables may be needed to ensure proper connections between the in-vehicle module 26 and various devices 16 -22. Flashing the interface module with the appropriate file allows digital communication between installed devices on the particular data bus used on the vehicle.

The system 10 can also be used for programming features of installed devices 16-22. For example, a vehicle security system will have an operating state and an configuration state. When in the configuration state, the installer may select the setting of various functions and features, such as alarm duration, passive door locking on exit, passive door locking on entry, dome light activation on entry. By entering the make and model of the installed device 16 -22 into appropriate fields of the app, the installer can send a request for product specific configuration files to the service provider 40. The service provider 40 retrieves the appropriate file from its databases 43-50 and transfers them to the handheld processor 30 via the internet or cellular phone network 38. The installer then selects on the app the setting for each configurable feature for the device. The data file is transmitted to the in-vehicle module 26 as a configuration file, which is then communicated over the vehicle data bus 14 to the appropriate device 16-22.

Alternatively, the installer can directly set the configuration of device features by directly interfacing with the device from the in-vehicle module 200 through the UBS Connector 246 or data connector 252. For example, a USB cable will be connected to both the device and in-vehicle module 200 through standard USB connector 246. The in-vehicle module 200 provides a wireless bridge between the device 16 -24 and the handheld processor 30. Using the handheld processor 30, the installer directly accesses the device configuration mode and selects the configuration of device function and feature settings within the device and sets them.

The system 10 further provide for testing of installed devices 16-22, and troubleshooting failures of the installed device 16-22. If there is a device failure, the installer can input a command to app to send instructions to query the memory of the device, interface device or vehicle body control module. This allows installers to view the recorded data messages that have been sent between the installed device 16-22 and any interface device or the body control module of the vehicle. The installer may also send specific function commands to the device to assess the devices response and determine failures. This allows installers to quickly identify and troubleshoot possible issues, and to solve them easily using the app.

The system 10 allows for reading and capturing performance and maintenance data from the vehicle data bus 14 when the in-vehicle module 26 is connected to the OBDII connector 24. The app may logs selected vehicles or device data messages transmitted on the data bus 14, or the app may periodically query any data normally logged and stored in any device or vehicle controller memory. The data may be transmitted from the handheld processor 30 over the cellular network 38 to a central server database 42 for collection, review and analysis by the device manufacturer, allowing for upgrading or customizing firmware for the particular vehicle. The system 10 may provide a manufacturer with a wireless link to the vehicle or any device installed in the vehicles that is connected to the data bus network 14

The system 10 provides a tool to remotely activate and test from inside the vehicle cell phone based telematics services. The installer accesses the telematics service provider through the app, sets up the user account and communicates command signals from devices to configure and test the telematics device. This eliminates the need for a second installer to test the system.

The system app also provides access to installation training tools such as videos, FAQs, certification testing and similar content. The app provides access to a hosted forum and allows installers to share experiences and stories about the device, or the installation within a particular vehicle.

The system 10 provides the installer access to a plurality of data for use during installation. Such data may include, vehicle wiring information, product manuals, user manuals, and installation instructions, which may be view on the phone or tablet, emailed, or printed to a local printer. The installer simply enters the vehicle year, make and model and sends the request by selecting an icon on the app graphical user interface. The request is transmitted through the cellular network 38 to the service provider 40. The proper document is retrieved from the appropriate database 43-50 and transmitted back to the installer.

The system 10 also provides for direct access via voice, email, text or video connection, to a technical support professional. The installer simply selects the appropriate icon on the app and a service request is forwarded to the technical support professional for response. In the app, the installer may select the type of preferred response type, such as phone call or email reply. The technical support professional can then personally walk through the installation and configuration of the device with the installer.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A device programming system for remotely programming at least one electronic device installed on a vehicle having a data bus system, the at least one electronic device having a plurality of configurable features and in digital communication with vehicle control systems through the data bus system, the device programming system comprising;
   a handheld remote programming module comprising a smart phone or tablet computer having a power source; a controller; user operable switches; an electromagnetic signal transceiver; a display; a non-volatile memory connected to the controller, the non-volatile memory holding executable instructions, wherein the executable instructions is an application received wirelessly from a wireless communications network and includes a graphical user interface represented on the display for selecting electronic device configuration setting indicia, digital content and voice content, the application further having device configuration indicia for programming device functions and features, and
   an in-vehicle module in electrical communication with the electronic devices through a connector associated with the data bus, the in-vehicle module in wireless communication with the remote programming module to communicate electronic device configuration setting indicia over said data bus to at least one electronic device installed on the vehicle, wherein the configuration settings indicia are stored in the electronic device to dictate the behavior of said electronic device, the in-vehicle module further receiving over the data bus electronic device status and fault data from the at least one electronic device and wirelessly communicating the device status and fault data to the remote programming module, whereby the system sends electronic device operational instructions for testing the installation of the electronic device, and receives diagnostic information from the electronic device to troubleshoot installation errors, and wherein the graphical user interface further provides for direct voice or electronic communication link with a technical service representative and wherein further the digital content is selected from a group comprising vehicle wiring diagrams, device installation instructions and device user manuals.

2. The device programming system of claim 1 whereby the in-vehicle module records data messages issued by the electronic devices associated with the data bus, the in-vehicle module transmitting said data messages to the remote programming module for display on the graphical user interface upon receipt of a data message transmission request from the remote programming module.

3. The device programming system of claim 1 whereby a digital or voice communication link is provided between a device installer and a technical support person.

4. The device programming system of claim 1 whereby the system can log and transfer to a central database vehicle data messages that are communicated on the data bus, the data aggregated for use in evaluating installation errors and building technical support protocols.

5. A device programming system for remotely programming at least one electronic device installed on a vehicle having a data bus system, the at least one electronic device having a plurality of configurable features and in digital communication with vehicle control systems through the data bus system, the device programming system comprising;
   a handheld remote programming module comprising a smart phone or tablet computer having a power source; a controller; user operable switches; an electromagnetic signal transceiver; a display; a non-volatile memory connected to the controller, the non-volatile memory holding executable instructions, wherein the executable instructions is an application received wirelessly from a wireless communications network and includes a graphical user interface represented on the display for selecting electronic device configuration setting indicia, digital content and voice content, the application further having device configuration indicia for programming device functions and features, and an in-vehicle module in electrical communication with the electronic devices through a connector associated with the data bus, the in-vehicle module in wireless communication with the remote programming module to communicate electronic device configuration setting indicia over said data bus to at least one electronic device installed on the vehicle, wherein the configuration settings indicia are stored in the electronic device to dictate the behavior of said electronic device, the in-vehicle module further receiving over the data bus electronic device status and fault data from the at least one electronic device and wirelessly communicating the device status and fault data to the remote programming module, whereby the system sends electronic device operational instructions for testing the installation of the electronic device, and receives diagnostic information from the electronic device to troubleshoot installation errors, and wherein the graphical user interface further provides for direct voice or electronic communication link with a technical service representative and wherein further the digital content is selected from a group comprising vehicle wiring diagrams, device installation instructions and device user manuals and whereby a device installer can provided information to a forum for installers to share their experiences and stories, or to read the writings of others.

* * * * *